United States Patent Office 3,298,778
Patented Jan. 17, 1967

3,298,778
PREPARATION OF MOLYBDENUM DI- AND TRIHALIDES
Robert E. Robinson, Adrian, Mich., assignor to Stauffer Chemical Company
No Drawing. Filed Nov. 4, 1964, Ser. No. 408,739
1 Claim. (Cl. 23—87)

This invention relates to the preparation of molybdenum halides. More particularly, this invention is directed to the preparation of molybdenum di- and trihalides from molybdenum pentahalides and molybdenum hexacarbonyl.

Accordingly, it is an object of the present invention to provide a new and useful method for the preparation of molybdenum di- and trihalides. It is a further object to provide such a method using molybdenum pentahalides as starting materials. It is a further object to provide such a method wherein the product is easy to separate.

These and other objects which will become apparent from the following description of the invention and the examples are satisfied by this invention.

In the practice of the present invention, a molybdenum pentahalide is reacted with molybdenum hexacarbonyl in an inert atmosphere, such as a vacuum or an inert gas, at elevated temperatures to form the desired molybdenum halides.

The reactions involved are best illustrated as follows:

(1) 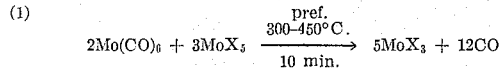

(2) 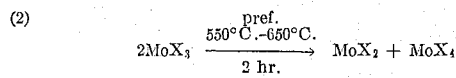

(3) 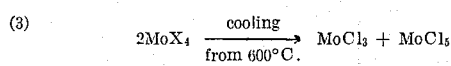

In these reactions, each X is a halogen atom, preferably bromine or chlorine.

The reactions are conducted in a non-reactive atmosphere such as nitrogen, helium or argon at temperatures from about 150° C. to about 650° C., depending on the desired product. If the molybdenum trihalides are desired, the temperature is kept in the range of 150° C. to 500° C., preferably from about 300° C. to about 450° C. If the molybdenum dihalides are desired, the temperature is raised to the 550° C. to 650° C. range. Reactions (1) and (2) can be accomplished separately by careful temperature regulation or can be accomplished simultaneously by using the temperature range of reaction (2). Reaction (1) is usually complete in from about 5 to about 15 minutes whereas reaction (2) generally takes several hours.

In a typical example of the process of the invention, an inert gas is passed over the two dry solid reactants at an elevated temperature as above mentioned. The reaction product is the appropriate molybdenum halide. Sublimation of the starting material makes possible the recovery of pure reaction product.

The molybdenum trihalide products have utility as intermediates in the preparation of the corresponding molybdenum dihalides which have utility as catalysts in olefin polymerization.

The invention is best illustrated by reference to the following examples.

*Example I*

0.012 mole (3.2 gms.) of molybdenum pentachloride and 0.008 mole (2.1 gms.) of molybdenum hexacarbonyl are heated in a slow stream of dry, oxygen-free, nitrogen at 425–475° C. for ten minutes. Copious amounts of solid sublime from the reaction zone, leaving 0.0069 mole (1.4 gms.) of a brick-red residue of molybdenum trichloride. The sublimate is a recyclable mixture of unreacted molybdenum pentachloride and molybdenum hexacarbonyl.

*Example II*

The process of Example I is repeated except that the initial mixture consisted of 0.0095 mole (2.6 gms.) of anhydrous molybdenum pentachloride and 0.0148 mole (3.9 gms.) of molybdenum hexacarbonyl. The product weighed 1.7 gm.

*Example III*

When Example I is repeated at 600° C. for two hours, the principal product is molybdenum dichloride.

*Example IV*

A horizontally mounted glass tube is packed with 0.015 mole (4.2 gms.) of anhydrous molybdenum pentachloride and 0.010 mole (2.6 gms.) of molybdenum hexacarbonyl in two separate zones, separated by a plug of glass wool. The tube is heated ten minutes at 425–475° C. A stream of dry, oxygen-free nitrogen is passed through the carbonyl bed and then the chloride bed. On cooling, the residue in the chloride bed consisted of 1.2 gm. of molybdenum trichloride.

The molybdenum trichloride is disproportionated by heating for two hours at 600° C. The product is molybdenum tetrachloride and the molybdenum dichloride.

It is understood that, in accordance with the provisions of the patent statutes, variations and modifications of the subject invention may be made without departing from the spirit thereof.

Having thus described my invention, I claim:

The method comprising reacting molybdenum hexacarbonyl and molybdenum pentachloride at a temperature of from about 300° C. to about 650° C. in an inert atmosphere for a period of at least about 5 minutes thereby to produce a compound selected from the group consisting of molybdenum dichloride and molybdenum trichloride.

References Cited by the Examiner

"Fluorine Chemistry," by J. H. Simons, volume 5, 1964, pages 61 and 488, Academic Press, New York.

Jacobson's "Encyclopedia of Chemical Reactions," volume 4, 1951 Edition, pages 678 and 679, Reinhold Publishing Corp., New York.

OSCAR R. VERTIZ, *Primary Examiner.*

EDWARD STERN, *Examiner.*